United States Patent [19]

Conner et al.

[11] Patent Number: 4,685,708
[45] Date of Patent: Aug. 11, 1987

[54] AXIALLY RESTRAINED PIPE JOINT WITH IMPROVED LOCKING RING STRUCTURE

[75] Inventors: Randall C. Conner; Van T. Walworth, both of Warrior, Ala.

[73] Assignee: American Cast Iron Pipe Company, Birmingham, Ala.

[21] Appl. No.: 837,402

[22] Filed: Mar. 7, 1986

[51] Int. Cl.4 .................................. F16L 21/02
[52] U.S. Cl. ................................. 285/374; 285/310; 285/321
[58] Field of Search .............. 285/374, 321, 310, 309, 285/367

[56] References Cited

U.S. PATENT DOCUMENTS

| 539,617 | 5/1895 | Harrington . | |
| 858,863 | 10/1900 | Pfeffer . | |
| 2,009,650 | 7/1935 | Claussen et al. | 285/135 |
| 2,991,092 | 7/1961 | MacKay | 285/110 |
| 3,381,983 | 5/1968 | Hanes | 285/321 |
| 3,464,722 | 9/1969 | Larkin | 285/367 |
| 3,684,320 | 8/1972 | Platzer et al. | 285/374 X |
| 3,698,744 | 10/1972 | Bevington | 285/111 |
| 3,813,065 | 5/1974 | Hallesy et al. | 285/321 X |
| 3,910,610 | 10/1975 | Turner et al. . | |
| 3,998,744 | 12/1976 | Arnold et al. . | |
| 4,033,613 | 7/1977 | Bram | 285/376 X |
| 4,068,865 | 1/1978 | Shanks, II | 285/309 X |
| 4,097,074 | 6/1978 | Nagao et al. | 285/321 X |
| 4,126,337 | 11/1978 | Nagao | 285/321 X |
| 4,127,290 | 11/1978 | Mutschlechner | 285/374 X |
| 4,296,953 | 10/1981 | Nagao et al. | 285/321 X |
| 4,428,604 | 1/1984 | Conner | 285/321 |
| 4,456,288 | 6/1984 | Conner | 285/321 |
| 4,524,505 | 6/1985 | Conner | 29/453 |

FOREIGN PATENT DOCUMENTS

| 1817319 | 7/1970 | Fed. Rep. of Germany . | |
| 2162435 | 6/1973 | Fed. Rep. of Germany . | |
| 41919 | 3/1977 | Japan | 285/321 |
| 106918 | 8/1979 | Japan | 285/374 |
| 106917 | 8/1979 | Japan | 285/374 |

Primary Examiner—Richard J. Scanlan, Jr.
Attorney, Agent, or Firm—Kerkam, Stowell, Kondracki & Clarke

[57] ABSTRACT

An improved form of articulated, segmented ring structure for an axially restrained pipe joint has an articulated, segmented ring formed from articularly interconnected ring segments and a ring adjustment mechanism operable from the exterior of the pipe joint for radially contracting the ring onto the spigot end of one pipe received within the bell end of another pipe. The segmented ring structure provides improved flexiblity in joint assembly and enhanced deflection characteristics for accommodating axial misalignment of the pipes. A ring adjustment mechanism is disclosed which is particularly suitable for use in many cases, including underwater and other limited visibility applications.

19 Claims, 17 Drawing Figures

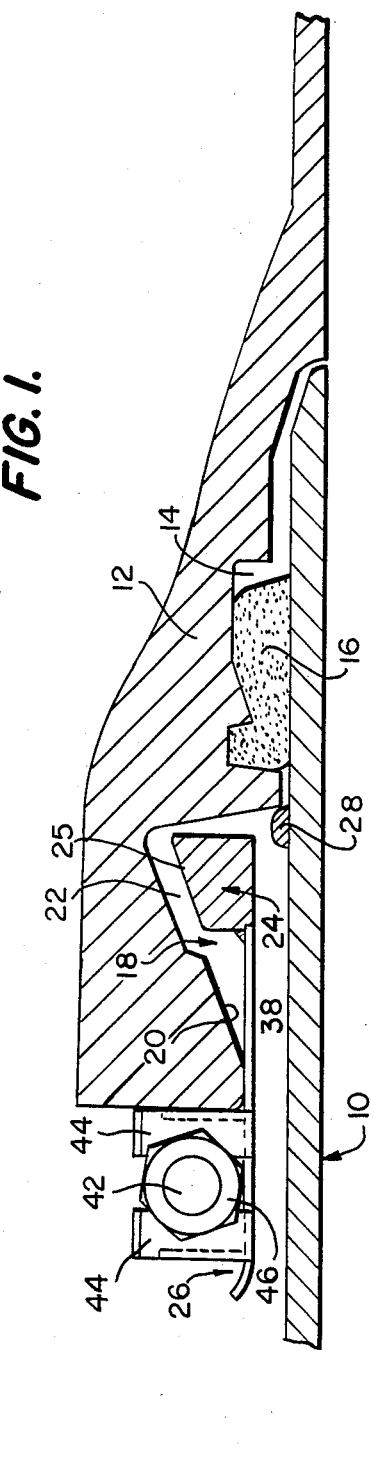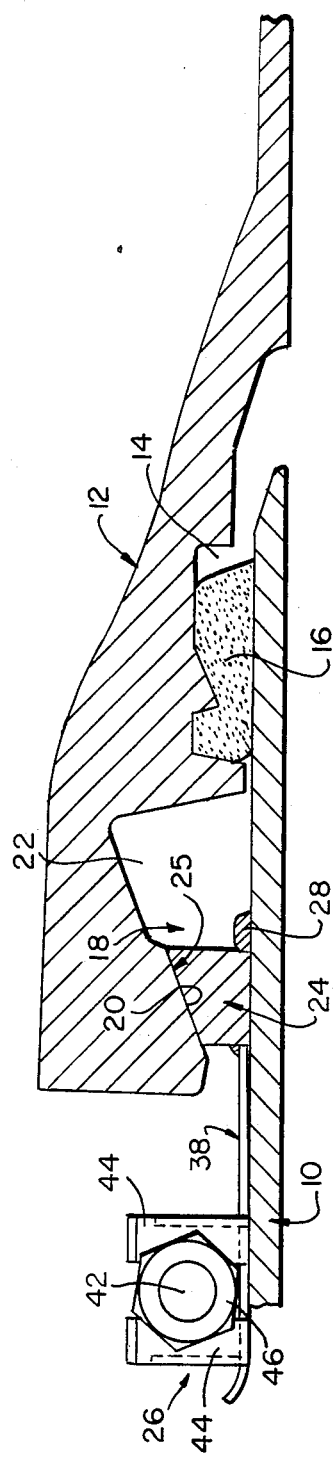

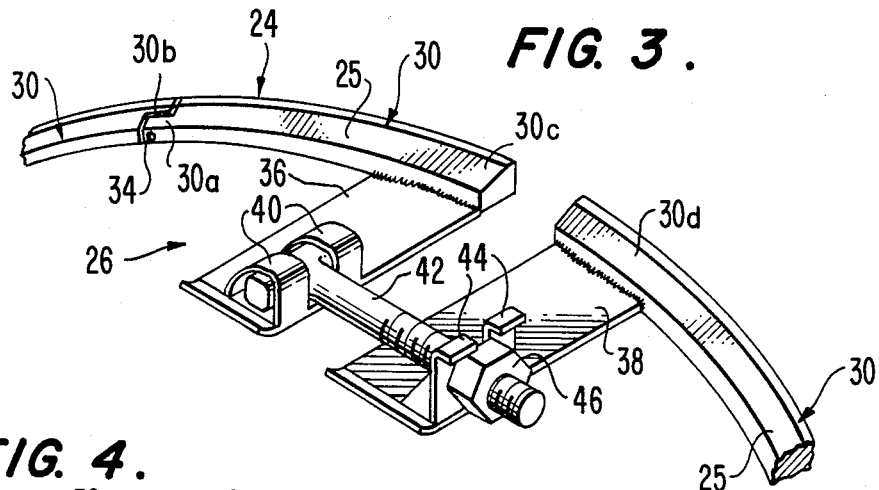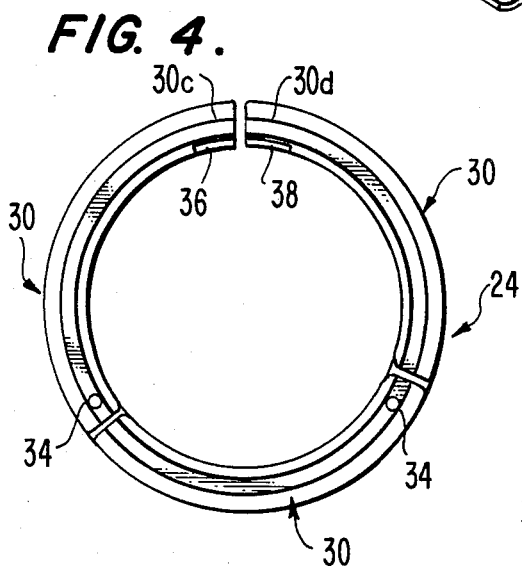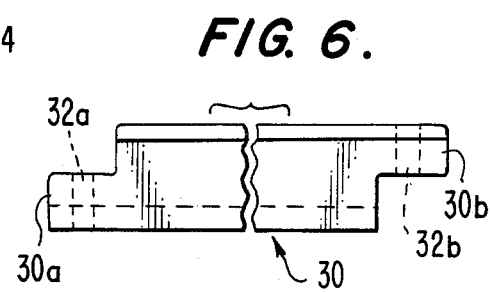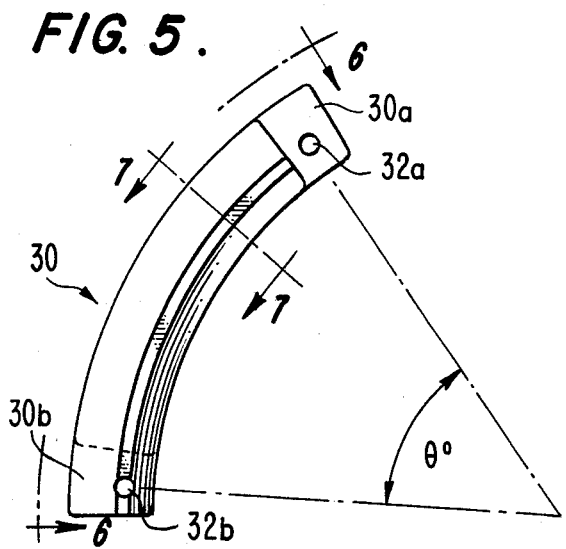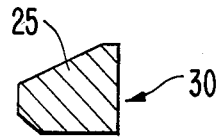

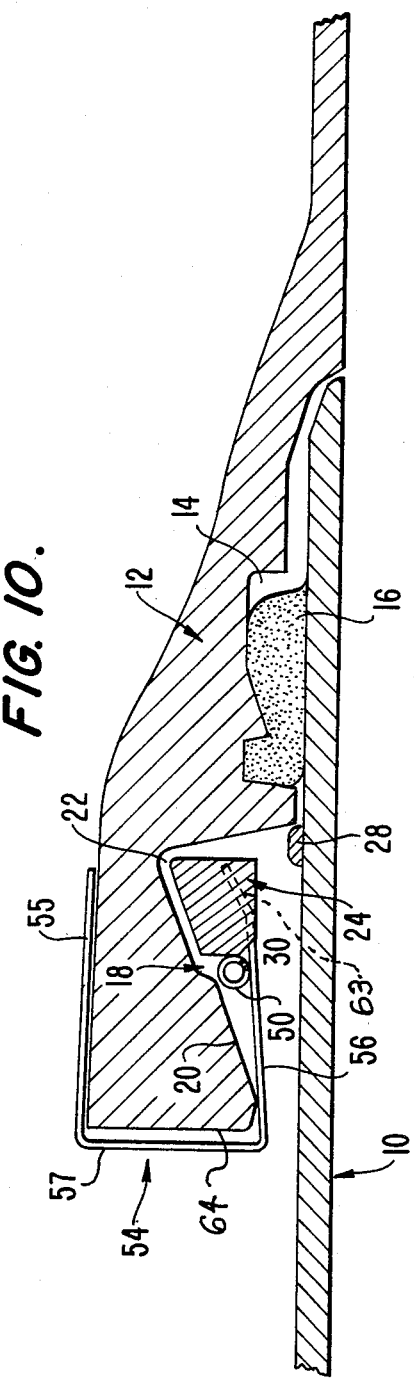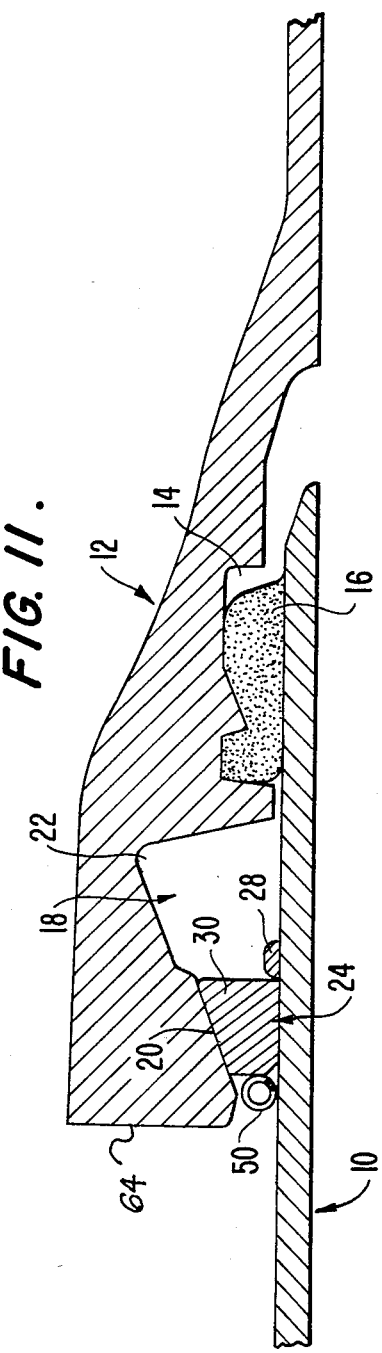

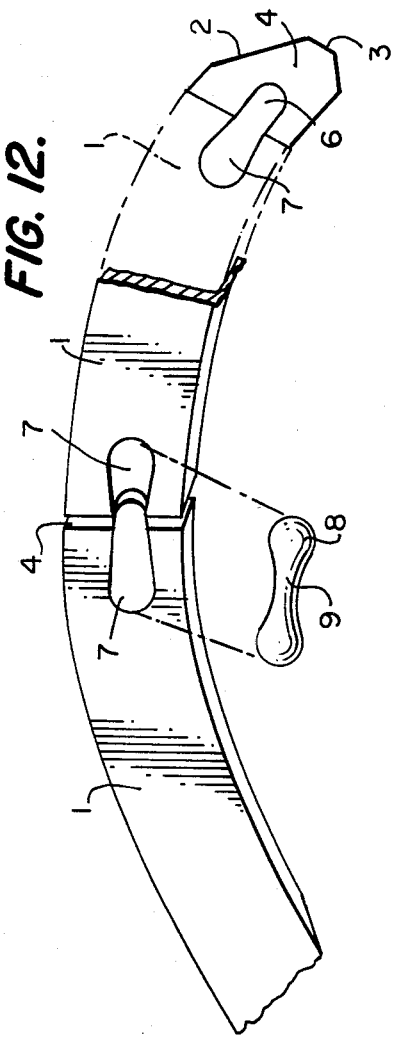
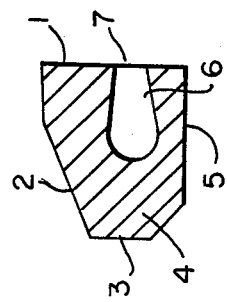
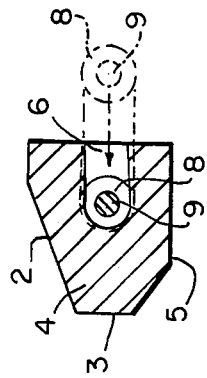
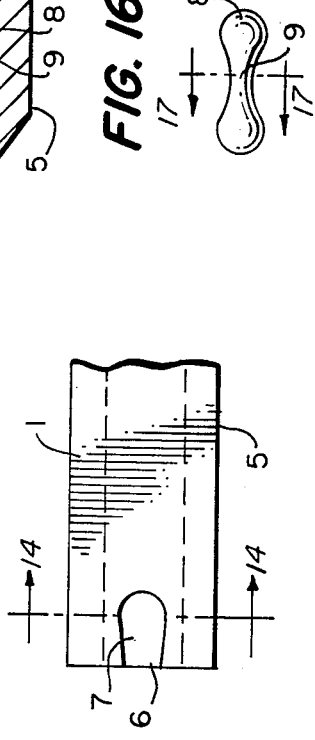

AXIALLY RESTRAINED PIPE JOINT WITH IMPROVED LOCKING RING STRUCTURE

BACKGROUND OF THE INVENTION

This invention relates to axially restrained pipe joints.

One well known form of pipe joint, for example, comprises a bell end provided on one pipe, an interfitting spigot end on an attached pipe, and a sealing gasket interposed between the bell and spigot ends. Numerous locking arrangements have been proposed for use in such joints to prevent axial movement of the spigot end relative to the bell end. Thus, for example, one such locking arrangement employs a split snap ring located inside of the bell end and which can be adjusted radially by a ring adjustment mechanism between a relaxed condition allowing for axial movement of the respective pipe ends and a tightened position in which the ring engages a circumferential bead or the like on one of the pipe ends to preclude relative axial movement therebetween in a direction separating the pipes. One particular form of snap ring structure of this type is shown, for example, in prior U.S. Pat. No. 4,428,604 to Conner and which is commonly assigned herewith. In the patented device, the adjustment mechanism for the snap ring comprises transverse pieces which extend axially from the respective ends of the split snap ring out of the mouth of the bell end, radial lugs on the outer ends of the transverse pieces, and a threaded stud connecting the lugs whereby radial adjustment of the segmented ring within the bell end as between the relaxed and tightened conditions is effected externally of the bell end by rotating the threaded stud nuts in the appropriate direction.

While pipe joints of the general type referred to above are in extensive use and are generally regarded as being satisfactory in performance, the present invention seeks to improve the design thereof in certain respects, more particularly in regard to the locking ring structure, so as to provide, inter alia, improved joint performance and characteristics.

SUMMARY OF THE INVENTION

It is a principal object of the invention to provide an improved form of restrained pipe joint of the general type referred to, particularly for use in relatively large diameter pipes, for example in the fourteen inch to fifty-four inch diameter range, which has a novel segmented ring structure affording greater flexibility, and accommodating a higher degree of misalignment as between the respective pipe ends than in known joints, while maintaining an adequate seal between the pipe ends and adequate axial restraint thereof.

Another object of the present invention is to provide an improved form of segmented ring structure for a restrained pipe joint, the structure incorporating an adjustment mechanism which enables an operator to manipulate the segmented ring as between relaxed and locked positions in the joint in a particularly expeditious manner from the exterior of the bell end. It is thus suitable for many applications where ease, speed and dependability of assembly are important, including environments of minimum visibility. Thus the structure is particularly useful in applications, such as underwater applications, where visibility is limited.

Broadly stated, the invention provides a split segmented ring structure for a restrained pipe joint of the type discussed above wherein the ring comprises articulating interconnected ring segments, with joint means between adjacent segments, for example in the form of pins or rivets extending substantially parallel to the axis of the ring, and a ring adjustment mechanism connected between terminal ends of a pair of outer segments of the ring for radially adjusting the ring as between relaxed and tightened conditions of the ring within the bell end of a pipe joint. The segmented ring structure is particularly adapted for use in a joint having a circumferential restraining bead around the spigot end of one of the pipes, the adjustment mechanism being used to radially contract the ring around the spigot end in front of said bead thereby preventing withdrawal of the bead from the bell end and axially restraining the pipe ends.

It is found that the segmented structure enhances the flexibility of the locking ring as compared with known one-piece split type snap rings, and increases the joint tolerance in accommodating misalignments as between the respective pipe ends. The number of ring segments may, for example, vary from two or three segments for smaller diameter joints up to eleven segments or more for large diameter joints. Intermediate diameter joints may have, for example, five or seven segments.

The ring adjustment mechanism may be of the threaded stud type as disclosed in the aforementioned prior U.S. Pat. No. 4,428,604, the disclosure of which is expressly incorporated herein by reference. As in this patent, the present invention contains only continuous, annular bell and spigot contours with no holes, slots, lugs, gaps, or other annular discontinuities, thus providing an absence of significant areas of weakening stress concentration as well as facility of centrifugal casting. Alternatively, in a preferred form of the invention particularly suited for limited visibility applications, but not limited to same, the adjustment mechanism may include a coil-type tension spring connected between the adjacent ends of the outer ring segments for biasing the ring toward a contracted condition. With this form of adjustment mechanism a retention clip removable from the exterior of the joint is provided between the ends of the ring for retaining the ring in expanded condition, for assembly, against the spring tension. A screw-on and screw-off shipping plate may also be provided for extra security in integral shipment of the joint components and to prevent assembly of the joint and removal of the retention clip until after the shipping plate itself has been removed. The bell clip includes a hook portion which enables the joint to tolerate reasonable misalignment in assembly. This clip effectively holds the spring radially outward to allow passage of the weld bead in assembly, as well as holding the expanded ring itself in the assembly position. The hook will "catch" the spring and attached ring ends as the clip is pried outward and pull them into the locked or assembled position.

The spring and clip-type ring adjustment mechanism is extremely simple to use in assembling a joint, simply by removal of the retention clip, making it particularly suitable for applications, such as underwater applications, where time and visibility are limited. Furthermore, if it becomes necessary or desirable to disconnect the joint, a segmented ring with a spring-type adjustment mechanism can easily be spread apart by the insertion of shims under the ring segments and replacement of the retention clip.

Another advantage of the present invention is that the locking ring can be pre-assembled in the pipe or fitting sockets at the factory and shipped to the Customer essentially ready for joint assembly. Of course, this effectively eliminates the need for the Customer to coordinate the movement of loose locking joint components on the job-site. A shipping plate with shipping plate screws are provided for extra security for integral shipment of the socket pieces with assembled rings. An additional function of the shipping plate assembly is that should assembly clip be damaged or dislodged in handling of the piece, it is a relatively simple matter to replace the same (or a new) bell clip back between the ends of the installed ring. In other words, the ring may be secured in the bell by virtue of the shipping plate and screws, although a bell clip must be inserted between the ring ends and the plate removed for proper joint assembly.

In addition to these functions, the shipping plate, after removal, can be used as a convenient "feeler gauge" to check for correct assembly of the joint to which it was originally attached by attempting to slide the flat end of the shipping plate between the spigot end and the inside of the ring around the joint. If the plate can freely be inserted between these surfaces and up to the weld bead at any location around the joint after an attempted assembly, the joint has not been correctly assembled and corrective measures are necessary. Such a "feeler gauge" would be particularly suited for any situation that the final ring position cannot be visually determined (such as some underwater assemblies).

Another advantage of the new joint structure is the improved loading geometry it offers over some known prior art, with more concentrated or discontinuous stress transfer. The new joint, when subjected to thrust, will exert substantially uniform, radial and circumferential loading on the bell and spigot members all around the joint perimeter. Of course, due to differential tolerances on joint components, it is impossible to have full 360° contact of members in all joints, although this contact can quite nearly be approximated in many instances. The effective locking contact is more than 345 degrees of joint circumference.

Additional features and advantages of the invention will become apparent from the following description and claims read in conjunction with the attached drawings.

BRIEF DESCRIPTION OF THE DRAWINGS

FIG. 1 is a sectional view of a pipe joint having a first form of segmented ring structure in accordance with the invention, the segmented ring structure being shown in an expanded condition allowing insertion and withdrawal of the spigot end of one pipe into the bell end of another pipe, FIG. 2 is a view similar to FIG. 1 but showing the segmented ring structure in a contracted or locked condition axially restraining the spigot end of the one pipe from being withdrawn from the bell end of the other pipe, FIG. 3 is a perspective view of a portion of the segmented ring structure used in the joint, FIG. 4 is an end elevational view of the segmented ring with parts of a ring adjustment mechanism removed, FIG. 5 is an end elevational view of a segmented ring segment, FIG. 6 is a sectional view on line 6—6 of FIG. 5, FIG. 7 is a sectional view on line 7—7 of FIG. 5, FIG. 10 is a sectional view of a pipe joint using the segmented ring structure shown in FIGS. 8 and 9 upon insertion of the spigot end of one pipe into the bell end of another pipe;

FIG. 11 is a view of the pipe joint shown in FIG. 10 with the segmented ring in locked condition;

FIG. 12 is a perspective view of an alternative embodiment of a "universal" joining means showing a fragmentary-view of adjacent segments of a ring structure;

FIG. 13 is a fragmentary elevational view of the end portion of a segment of FIG. 12;

FIG. 14 is a sectional view of the segment taken along lines A—A of FIG. 13;

FIG. 15 is a sectional end view of a segment as in FIG. 14, but showing a connecting link press-fit in position;

FIG. 16 is a side, elevational view of a dumb bell shaped connecting link; and

FIG. 17 is a sectional view taken along lines B—B of FIG. 16.

DESCRIPTION OF THE PREFERRED EMBODIMENTS

Figure 8:
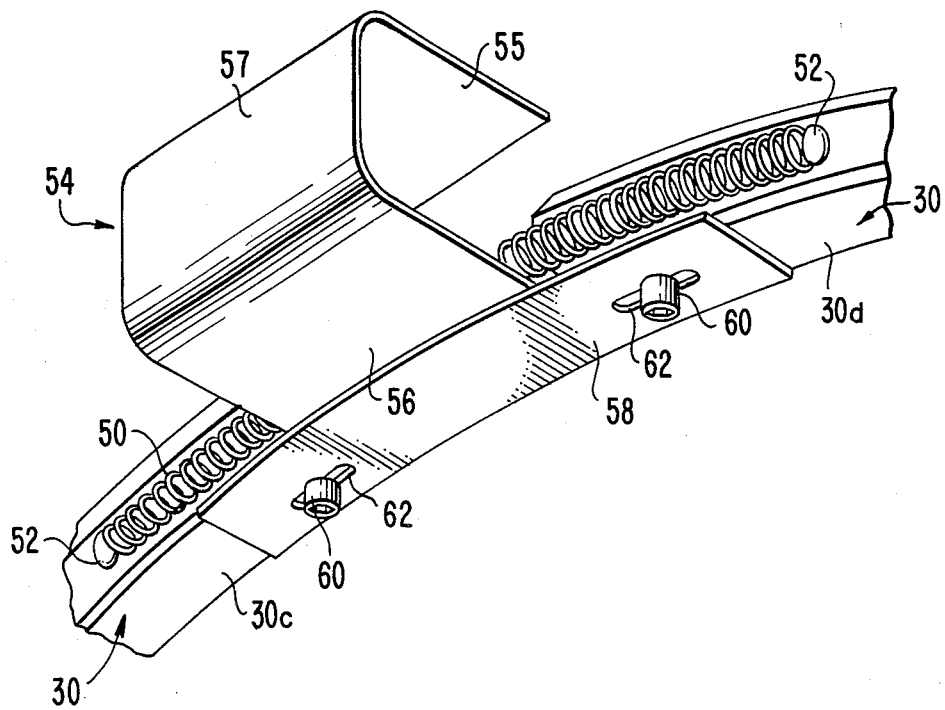
FIG. 8 is a perspective view of a segmented ring structure having a preferred form of ring adjustment mechanism in accordance with the invention.

Referring to FIGS. 1 to 7 of the drawings, and initially to FIGS. 1 and 2 in particular, there is illustrated a first embodiment axially restrained pipe joint in accordance with the invention forming a connection between the spigot end 10 of a first pipe and the bell end 12 of a second pipe. Bell end 12 is formed with a circumferential pocket or recess 14 accommodating a circumferential pipe seal or gasket 16, which may, for example, comprise a known form of double sealing action gasket as disclosed in U.S. Pat. No. 2,991,092 to McKay, issued July 4, 1961, and expressly incorporated herein by reference. Towards its mouth or open end, the bell end 12 is formed with a larger circumferential segmented ring-receiving pocket 18 formed with a tapered circumferential wall portion 20 and a larger diameter receiving portion 22. Pocket 18 receives a circumferential segmented ring 24 of a segmented ring structure which also includes a ring adjustment mechanism 26. The spigot end 10 is provided with a welded or like circumferentially extending restraining bead 28 or like projection.

The details of the segmented ring structure are illustrated in FIGS. 3 to 7. Thus, ring 24 in accordance with a significant aspect of the invention, is formed from a plurality of like ring segments 30, each of ductile cast iron or the like, having a profile as shown in FIG. 7, and each having oppositely rebated end portions 30a and 30b formed with respective through holes 32a, 32b, the segments being articulately interconnected by respective pivot pins, rivets or the like 34, which may be of stainless steel, received in the respective holes, with the pivot axes substantially parallel to the axis of the ring. In the illustrated embodiment, ring 24 is formed from three pivotally interconnected ring segments 30 (FIG. 4) each having a circumferential extent of about 120°. However, as previously noted, the number of ring segments may vary dependent on pipe diameter, and FIG. 5 shows a ring segment having a circumferential extent of about 51.4° for use in a seven-segment ring.

The rebated end portions 30a and 30b at the adjacent ends 30c, 30d of a pair of the ring segments may be removed to provide the ring with a radial adjustment facility, and the ring adjustment mechanism 26 may be secured between these ends. The adjustment mechanism includes axially extending plates 36, 38 welded to the respective ring ends 30c, 30d plate 36 being provided with a receiving socket (formed by bent-over and welded webs 40) for the head of a T-head threaded bolt 42, and plate 38 being formed with a socket (formed by upstanding webs 44) for the tail end of the bolt. The bolt is provided with adjusting nut 46, and it is understood that threading of the nut onto the bolt is effective radially to contract ring 24, while threading of the nut in the opposite direction and on the opposite side of upstanding webs (44) is effective to relax or expand the ring for joint disassembly. As clearly shown in FIG. 3, the head of the T-head bolt 42 extends substantially axially and allows axial pivoting of the bolt 42 along the slot between webs 40 such that the tail end of the bolt 42 may be moved (after adjustment of nut 46) along the slot shown between upstanding webs 44.

In assembly of a pipe joint as described, ring 24 is initially in radially expanded condition received in portion 22 of pocket 18 of the bell end 12 (FIG. 1) with the ring adjustment mechanism 26 extending out of the mouth of the bell end. In this condition of the ring, spigot 10 can be inserted into the bell end with radial clearance under ring 24 being provided for the spigot bead 28 so that the bead can be passed into the bell beyond ring 24. Then, nut 46 is tightened onto stud 42 causing ring 24 to be contracted radially effectively moving the ring down along wall 20, tightening the ring onto the spigot so that it is trapped between the exterior of the spigot end and wall 20, and eliminating the clearance for bead 28, so that the spigot end is effectively restrained and cannot be withdrawn beyond a position (FIG. 2) wherein bead 28 engages behind ring 24. It will be noted that the ring segments are profiled to provide an outer ring surface 25 complimentary to wall portion 20 of the bell end.

The articularly segmented nature of ring 24 provides a degree of ring flexibility, when relaxed, facilitating positioning of the ring in the bell, and the axial spacing between ring 24 and webs 40, 44 preferably is related to the axial dimensions of the bell, so that in the FIG. 1 condition, ring 24 is properly located in pocket portion 22 for subsequent tightening down wall 20. Moreover, the flexibility of the ring allows for joint adjustment for a degree of axial misalignment as between the respective pipes which is greater than in some known forms of pipe joints, and the ring is cost effective in manufacture since the segments can be made without machining in relatively small molds.

Figure 9:
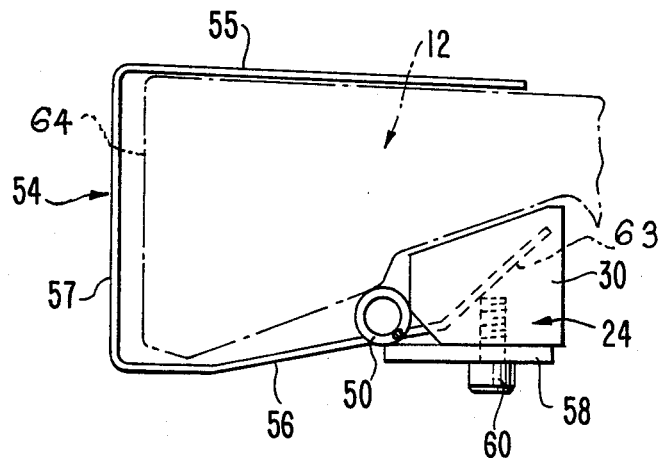
FIG. 9 is a sectional view of the segmented ring structure of FIG. 8 shown in shipping position in the bell end of a pipe.

In a second embodiment of the invention as shown in FIGS. 8 to 11, and which is particularly suitable for many applications, including underwater or poor visibility applications, a locking ring structure used for locking a joint formed between the respective pipe ends comprises a segmented articulated ring 24 of like form to that of the first embodiment and a modified form of ring adjustment mechanism for both holding the ring in the expanded or assembly position and providing radial contracting movement of the ring segments to tighten same onto the exterior of spigot end 10 by virtue of ring ends 30e and 30d bearing on the edges of the inner limb 56. In this case, the adjustment mechanism includes a tension-type coil spring 50 attached to rivets 52 on the ends 30c and 30d of the outer ring segments, so as to act as a resilient biasing means and urge the ring into contracted condition. In order to retain the locking ring in radially expanded condition for assembly of the pipe joint, a substantially U-shaped bell assembly clip 54 is provided having an inner limb 56 with bent up hook portion 63, the limb 56 is pressed between the end faces of the outer ring segments holding spring 50 in extended position, with an outer limb 55 and a radially extending bridge portion 57 connecting the inner and outer limbs, the clip is dimensioned so as to embrace the mouth of bell end 12, as shown in FIGS. 9 and 10 with ring 24 located in the receiving portion 22 of pocket 18. An additional function of the unique bell assembly clip 54 is to hold the spring 50 radially outward in assembly to allow passage of the spigot weld bead 28 into its assembled position as shown in FIG. 10. For shipping purposes, the ring structure also includes a shipping plate 58 connected between the inner faces of the adjacent ring segments by shipping screws 60 fitting into radially drilled holes in the respective end segments through slots 62 in plate 58, pressing limb 56 of clip 54 outwardly (FIG. 9) and effectively preventing easy dislodgement of the clip.

As the clip is pried outward and away from the face of the bell (64 on FIGS. 9, 10, and 11), the hook 63 will catch the spring and attached ring ends and pull them in the direction of the bell face 64 and into the locked or assembled joint position.

When the pipe joint is to be assembled, shipping plate 58 is removed, providing relaxation of the spring 50 and the ring ends 30c and 30d onto limb 56 of the clip as shown in FIG. 10. Spigot end 10 can then be inserted into bell end 12 as in the previous embodiment, with retention bead 28 passing under the snap ring. To lock the joint, clip 54 is then removed by prying same away from the bell end, allowing the segmented ring to be contracted onto the spigot end under the action of spring 50. The action of prying the clip 54 away from the bell end 12 also performs a dual function of dependably pulling the ring 24 toward the bell locking surface 20, away from and off of the spigot weld bead 28, as the radially outward bent end of limb 56 hooks the center of spring 50. The importance of this feature becomes obvious when one considers that unintentional or intentional joint deflection in assembly, even of a fully inserted spigot, could result in the possibility of a location where the weld 28 could be pulled out or slightly underneath the ring in the assembly position as shown in FIG. 10. When the spring and ring ends are pulled outward toward the bell face by the bell clip (and pulled down on the pipe at that location by the spring), the rest of the ring will generally follow (in somewhat of a "zipper-like" fashion) over the and firmly into contact with the pipe barrel in the fully locked or assembled position as shown in FIG. 11. The joint can thus tolerate reasonable misalignment in assembly. The spigot can then be withdrawn to the position shown in FIG. 11 where the retention bead engages the back of the locking ring. The positioning of the assembled ring firmly against the spigot end 10 can be checked visually or by means of a feeler gauge if installed underwater or in other poor visibility situations. The relatively thin shipping plate 58 can conveniently be used as such a "feeler" gauge by attempting to insert the flat end of this piece between the ring 24 and the spigot end 10. The locking ring will normally spring directly into the correct assembled condition, however, should the ring contract onto the spigot in an incorrect location, the spigot can be deflected slightly in the appropriate direction allowing the ring to seat correctly.

After joint assembly, the joint may be deflected, if required, within an allowed range. Should joint disassembly be required, if the joint has been subjected to joint separating forces, it is necessary again to home the pipe spigot fully to the rear of the bell end (FIG. 11) to allow the ring to be expanded over bead 28 for spigot removal. The ring may then be expanded by driving rectangular steel extractor shims up underneath the locking ring segments at substantially equal intervals around the joint, the shims being of a thickness about equal to, but no greater than bead 28. If required, the assembly clip 54 can then be reinserted between the sprung ends of the ring segments for dependable spigot removal.

FIG. 12–17 illustrate an alternate embodiment for joining articulated segments wherein the segments 4 are articularly interconnected by a compressable link which may be in the shape of a dumb bell. As shown in FIG. 12, each segment, includes a central channel or groove 6 having a narrowed or restricted entrance passage 7. The face side 1 and base 5 of each segment are flat and join each other at a right angle. Top surface 2 includes a short flat surface which joins a downwardly tapered portion 2. Portion 2 terminates at the upper end of a flat rear wall section as best shown in FIG. 14, the lower end of which joins an angled wall section to complete the profile.

Referring to FIGS. 15-17, it will be seen that the interconnecting link 8 includes a central section 9 of restricted diameter and opposite end sections of enlarged diameter. The link is advantageously compressible to provide a press fit as best shown in FIG. 15. To this end, link 8 may be made of a suitable compressible material such as rubber. In this manner, adjacent segment ends are provided with an articulated joint providing good load transfer characteristics.

While only preferred embodiments of the invention have been described herein in detail, the invention is not limited thereby, and modifications may be made within the scope of the attached claims.

What is claimed is:

1. An articulated, segmented ring structure for use in an axially restrained pipe joint wherein a spigot end of one pipe fits in a bell end of another pipe, the articulated, segmented ring structure comprising a plurality of ring segments, means articularly interconnecting the respective segments to form an articulated, segmented ring having substantially uniform effective cross-section and adjacent ends, and a ring adjustment mechanism interconnected between the adjacent ends of the ring for providing radial contraction of the ring onto the spigot end of the one pipe when the ring is located in the bell end of the other pipe, and wherein the ring adjustment mechanism includes a tension-type coil spring connected between the adjacent ends of the ring biasing the ring toward radially contracted condition.

2. The invention of claim 1 wherein the structure includes an assembly clip having a limb portion for fitting between said adjacent ends of the ring to retain the ring and spring in expanded condition in opposition to the spring force, and an engageable portion for location outside of the bell end for positively withdrawing the ring axially toward a locked position, withdrawing the clip from between the ring ends and enabling the spring to contract the ring onto the spigot end of the one pipe.

3. The invention of claim 2 wherein the assembly clip is substantially U-shaped for embracing the bell end of the pipe, said limb portion comprising an inner limb of the clip and said engagement portion comprising an outer limb of the clip and a base portion of the clip connecting the inner and outer limbs.

4. The invention of claim 2 wherein the structure includes a shipping plate and screw means for releasably attaching the shipping plate to the adjacent ends of the ring under the assembly clip for secure shipment and for preventing withdrawal of the clip prior to removal of the shipping plate.

5. A combination for use in forming an axially restrained pipe joint comprising a bell end on one pipe, a spigot end on another pipe for receipt in the bell end, sealing gasket means for receipt between the bell end and spigot end, a projection on the spigot end, a radially contractable articulated, segmented ring for confinement in the bell end, the articulated segmented ring comprising articularly interconnected ring segments deifining a ring with interconnected ring segments defining a ring with adjacent ends, and substantially uniform cross section, and a ring adjustment mechanism operable from the exterior of the bell end and connected between said adjacent ends of the ring for providing radial contraction of the ring from a radially expanded condition wherein the projection on the spigot end can be passed into the bell end through thering to a radially contracted position preventing withdrawal of the spigot projection through the ring and thereby axially restraining the spigot end within the bell end, and wherein the ring adjustment mechanism includes a tension spring connected between the respective ring ends for urging the ends toward one another thereby contracting the ring, and an assembly clip inserted between the ring ends for holding the ring in the radially expanded condition against the spring force, the clip extending out from the mouth of the bell end for withdrawal from between the ring ends, pulling the spring and attached ring toward the bell retaining surface and away from the projection on the spigot end, enabling the spring to radially contract the ring onto the spigot end of the other pipe.

6. The invention of claim 5 wherein the assembly clip is olf a generally U-shaped form embracing the bell end, the clip having an inner limb inserted between the ends of the ring, an outer limb extending substantially axially over the exterior of the bell end, and a radial bridge portion external to the mouth of the bell end connecting said limbs.

7. The invention of claim 6 wherein a terminal end portion of the inner limb of the clip is bent radially outward toward the outer limb.

8. The invention of claim 7 wherein the clip is secured in place between the ends of the ring by a a shipping plate releasably secured to the respective ends of the ring under the inner limb of the clip for security of components in shipping and removal prior to insertion of the spigot end of the other pipe into the bell end of the one pipe.

9. An axially restrained pipe joint comprising a bell end on one pipe, a spigot end on another pipe received in the bell end, sealing gasket means between the bell end and spigot ends, a projection on the exterior of the spigot end located within the bell end between the gasket means and the mouth of the bell ends, and an articulated, segmented ring formed of articularly interconnected ring segments trapped between the exterior surface of the spigot end and an internal wall of the bell end between the projection on the spigot end and the mouth of the bell end, the ring forming an abutment for the projection axially restraining the spigot end against withdrawal from the bell end, and wherein the internal wall of the bell end is tapered inwardly toward the mouth of the bell end and merges inwardly of the bell end into an enlarged ring receiving pocket portion of the bell end, the ring being radially expandable into said pocket portion by ring adjustment means manipulated from externally the mouth of the bell end to provide radial clearance for the projection on the spigot end allowing withdrawal thereof from the bell end, wherein the ring the ring has adjacent ends with a tension spring connected therebetween urging the ends of the ring together thereby radially contracting the ring onto the spigot end, and wherein the ring adjustment means comprises shim means for insertion between the exterior of the spigot end and the respective ring segments for radially expanding the ring into said pocket portion and thereby permitting withdrawal of the spigot end from the bell end.

10. An articulated, segmented ring structure for use in an axially restrained pipe joint wherein a spigot end of one pipe fits in a bell end of another pipe, the articulated, segmented ring structure comprising a plurality of ring segments, means articularly interconnecting the respective segments to form an articulated, segmented ring having substantially uniform effective cross-section and adjacent ends, and a ring adjustment mechanism interconnected between the adjacent ends of the ring for providing radial contraction of the ring onto the spigot end of the one pipe when the ring is located in the bell end of the other pipe, further including a ring expansion clip insertable from the exterior of the bell end between the ends of the ring to retain the ring in radially expanded condition, and wherein said ring segments comprise metal castings with rebated ends, and pivot pin means interconnecting the rebated ens of adjacent segments, and providing limited flexiblity between segments. the pivot pin means extending substantially parallel to the axis of the ring.

11. A method of assembling a pipe joint having a bell end on one pipe and a spigot end with an external projection on another pipe for fitting into the bell end, the method including the steps of providing a sealing gasket means inside of the bell end for sealing around the exterior of the spigot end, providing a radially contractable articulated, segmented ring formed of articlarly interconnected ring segments within the bell end between the gasket means and the mouth of the bell end, the articulated, segmented ring including a ring closure mechanism extending out of the mouth of the bell end, inserting the spigot end into the bell end to an extend that said projection passes through the articulated, segmented ring, and operating the ring closure mechanism external to the bell end so as to contract the articulated, segmented ring, trapping same between the exterior of the spigot end and an internal wall of the bell end thereby preventing withdrawal of said projection beyond the articulated, segmented ring and axially restraining the spigot end within the bell end, and which allows the step of axially withdrawing the spigot end in the direction away from the bell end after contraction of the articulated, segmented ring so as to engage said projection with the articulated, segmented ring, wherein the ring initially has adjacent ends urged toward one another by a spring means and held apart by an assembly clip defining the closure mechanism, the clip extending out of the mouth of the bell end, and wherein the operating step compreises prying the clip out from between the ends of the ring external of the bell end, thereby pulling the spring and ring toward the bell restraining surface and away from projections on the spigot end.

12. A method of disassembling a pipe joint which has previously been assembled in accordance with a method as claimed in claim 11, the disassembly method including the step of inserting shims under the respective ring segments from outside of the mouth of the bell end so as to radially expand the ring against the spring force to an extend permitting withdrawal of said projection through the ring.

13. The method of claim 12 including the further step of reinserting the assembly clip between the ends of the expanded ring for joint disassembly.

14. An articulated, segmented ring structure for use in an axially restrained pipe joing wherein a spigot end or one pipe fits in a bell end of another pipe, the articulated, segmented ring structure comprising a plurality of ring segments, means articularly interconnecting the respective segments to form an articulated, segmented ring having substantially uniform effective cross-section and adjacent ends, and a ring adjustment mechanism interconnected between the adjacent enos of the ring for providing radial contraction of the ring onto the spigot end of the one pipe when the ring is located in the bell end of the other pipe, said ring adjustment mechanism including a tension-type coil spring connected between the adjacent ends of the ring biasing the ring toward a radially contracted condition, said structure further including an assembly clip having a limb portion between adjacent ends of the ring to retain the ring and coil spring in expanded condition in opposition to a spring biasing force.

15. The structure of claim 14 wherein said limb portion includes hook means for positively withdrawing the ring axially toward a locked position.

16. An articulated, segmented ring structure for use in an axially restrained pipe joint wherein a spigot end of one pipe fits in a bell end of another pipe, the articulated, segmented ring structure comprising a plurality of ring segments, means articularly interconnecting the respective segments to form an articulated, segmented ring having substantially uniform effective cross-section and adjacent ends, and a ring adjustment mechanism interconnected between the adjacent ends of the ring for providing radial contraction of the ring onto the spigot end of the one pipe when the ring is located in the bell end of the other pipe, wherein the interconnecting means is a compressible link joining adjacent segments.

17. An articulated, segmented ring structure for use in an axially restrained pipe joint wherein a spigot end of one pipe fits in a bell end of another pipe, the articulated, segmented ring structure comprising a plurality of ring segments, means articularly interconnecting the respective segments to form an articulated, segmented ring having substantially uniform effective cross-section and adjacent ends, and a ring adjustment mechanism interconnected between the adjacent ends of the ring for providing radial contraction of the ring onto the spigot end of the one pipe when the ring is located in the bell end of the other pipe, wherein each segment includes a channel in each end having a restricted passage for receiving a compressible interconnecting link.

18. The invention of claim 17 wherein the compressible link includes a central section having a restricted dimension is less than the dimension of opposite end sections.

19. An articluated, segmented ring structure for use in an axially restrained pipe joint wherein a spigot end of one pipe fits in a bell end of another pipe, the articulated, segmented ring structure comprising a plurality of ring segments, means articularly interconnecting the respective segments to form an articulated, segmented ring having substantially uniform effective cross-section and adjacent ends, and a ring adjustment mechanism interconnected between the adjacent ends of the ring for providing radial contraction of the ring onto the spigot end of the one pipe when the ring is located in the bell end of the other pipe, and wherein the ring adjustment mechanism includes resilient biasing means connected between the adjacent ends of the ring biasing the ring toward radially contracted conditon.

* * * * *

UNITED STATES PATENT AND TRADEMARK OFFICE
CERTIFICATE OF CORRECTION

PATENT NO. : 4,685,708

DATED : August 11, 1987

INVENTOR(S) : Conner et al

It is certified that error appears in the above-identified patent and that said Letters Patent is hereby corrected as shown below:

Column 8, line 23, "deifining" should be --defining--.
    lines 23-24, delete "interconnected ring segments defining a ring with"
Column 8, line 30, "thering" should be --the ring-- (2 words).
Column 8, line 47, "olf" should be --of--.
Column 8, line 57, delete "a" (second occurance)
Column 8, line 66, "ends" should be --end--.
Column 8, line 68, "ends" should be --end--.
Column 9, line 16, delete "the ring" (second occurance).
Column 9, line 41, "ens" should be --ends--.
Column 10, line 5, "compreises" should be --comprises--.
Column 10, line 22, "joing" should be --joint--.
Column 10, line 22, "or" should be --of--.
Column 10, line 30, "enos" should be --ends--.
Column 11, line 7, "articluated" should be --articulated--.

Signed and Sealed this

Twenty-ninth Day of December, 1987

Attest:

DONALD J. QUIGG

*Attesting Officer*     *Commissioner of Patents and Trademarks*